(12) United States Patent
Evans et al.

(10) Patent No.: US 12,289,209 B1
(45) Date of Patent: Apr. 29, 2025

(54) MANAGING NETWORK CAPACITY BASED UPON SIMULATION OF FAILURES OF NETWORK DEVICES

(71) Applicant: Amazon Technologies, Inc., Seattle, WA (US)

(72) Inventors: John William Evans, Frome (GB); Ahmed Elmokashfi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/216,385

(22) Filed: Jun. 29, 2023

(51) Int. Cl.
*G06F 15/177* (2006.01)
*H04L 41/12* (2022.01)
*H04L 43/062* (2022.01)
*H04L 43/55* (2022.01)

(52) U.S. Cl.
CPC ............ *H04L 41/12* (2013.01); *H04L 43/062* (2013.01); *H04L 43/55* (2022.05)

(58) Field of Classification Search
None
See application file for complete search history.

(56) References Cited

U.S. PATENT DOCUMENTS

| | | | |
|---|---|---|---|
| 8,219,848 B2 * | 7/2012 | Branson | G06F 11/2097 714/25 |
| 11,546,225 B1 * | 1/2023 | Ahuja | H04L 45/38 |
| 2013/0339545 A1 * | 12/2013 | Shenoi | H04L 63/1416 709/240 |
| 2015/0319050 A1 * | 11/2015 | Kasturi | H04L 41/5074 709/224 |
| 2018/0196893 A1 * | 7/2018 | Obregon | G06F 17/18 |
| 2019/0058638 A1 * | 2/2019 | Ahuja | H04L 43/0811 |
| 2023/0188429 A1 * | 6/2023 | Neal | H04L 45/7453 709/223 |

* cited by examiner

Primary Examiner — Phuoc H Nguyen
(74) Attorney, Agent, or Firm — Klarquist Sparkman, LLP

(57) ABSTRACT

A system is described that combines outputs of network simulations, which are used for capacity planning, with empirical data of network element failure probabilities, to produce what traffic utilization is needed for each network device interface to achieve a specified availability target. Utilization of each interface can be captured for each failure case simulated. From this failure data, the utilization distribution for each link can be produced, across all failure cases. This utilization-by-failure data from simulation is combined with the empirical mean-time between failure (MTBF) and mean-time to recovery (MTTR) of each failure from the span reliability data set. This allows for a prediction of what percentage of time the interface is utilized. Thus, a relationship is established between the capacity provisioned and the percentage of time that the capacity will be uncongested. Network devices can then be added to the network to establish the availability target.

19 Claims, 9 Drawing Sheets

MANAGING NETWORK CAPACITY BASED UPON SIMULATION OF FAILURES OF NETWORK DEVICES

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing is a growing industry and adding network capacity is generally based upon predictions of increasing traffic demands. Adding network capacity can include the generation of new capacity through building data centers and supplying corresponding hardware to populate the data centers. Example hardware includes server computers, racks, switches, power supplies, memory, etc. Such infrastructure capacity planning can be accomplished using a traditional Materials Requirement Planning (MRP) paradigm to model and plan capacity in the future.

Adding new capacity to a network also includes predicting failures that can occur in the network. A logical model of the network can be generated, a forecasted traffic demand matrix can be overlayed on the model, and a simulation can be performed based upon a variety of network failure conditions (node, link, and/or site failures). The failure scenario is then used to modify a capacity target. The capacity target can be reached by adding the necessary hardware or link capacity to the network.

DETAILED DESCRIPTION

Previous capacity planning used a worse-case failure scenario without consideration of costs or of the probability of the failure occurring. A system is described that combines outputs of network simulations, which are used for capacity planning, with empirical data of network element failure probabilities, to produce what traffic utilization is needed for each network device interface to achieve a specified availability target. Thus, trade-offs between the capacity required to accommodate network failures and the resulting network availability can be taken into consideration.

Utilization of each interface can be captured for a plurality of failure cases simulated, i.e., rather than just capturing the worst-case utilization across all failures. From this failure data, the utilization distribution for each link can be produced across all failure cases. This utilization-by-failure data from simulation is combined with the empirical mean-time between failure (MTBF) and mean-time to recovery (MTTR) of each failure from the span reliability data set. This allows for a prediction of what percentage of time the interface is utilized, i.e., due to the probability of the failures that cause each utilization. Thus, a relationship is established between the capacity provisioned and the percentage of time that the capacity will be uncongested.

Figure 1:
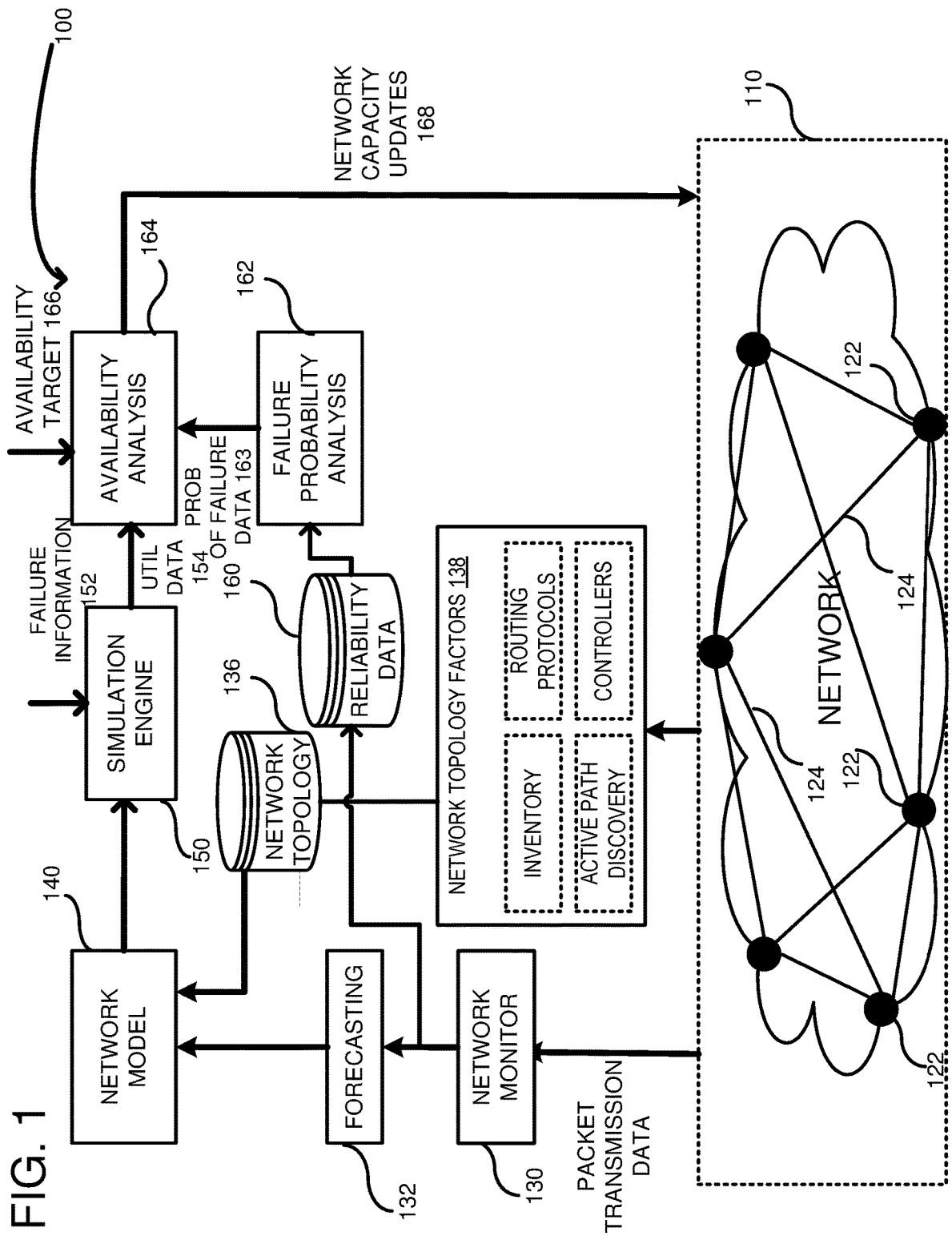
FIG. 1 is a diagram of an example system used to implement network capacity updates based upon simulation of failures and a probability of the failures occurring.

FIG. 1 shows a system 100 used for adding network capacity to a network 110. The network 110 can be a geographically distributed collection of nodes (e.g., network devices, shown generally at 122), and communication links (i.e., paths), shown generally at 124, for transporting data between the nodes. Although represented as a few network devices and links, the network 110 generally includes hundreds of thousands of such devices and links. The network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. A network device can also include any device used for forwarding packet data through the network 110. The links 124 can be any optical or electrical cables for interconnecting the network devices, such as Ethernet cables, as well as radio-based connections. The network devices can be configured and updated, wherein the configurations include software versions (applications and operating system versions), variables, policies, protocols used, protocol parameters, frequency, speed, interface settings, etc. As explained further below, the network devices further include forwarding tables that control how packets are routed through the network. Each network device 122 can represent an interface of a network device, a container, and/or other hierarchical tier that aggregates interfaces of network devices. As used herein, interfaces refer to ports of the network device that provide connectivity to other devices of the network. As such, each network device may have multiple interfaces, for example, input ports and output ports. As used herein, implementing a network update can mean installing any of the hardware or software described above.

The network 110 illustrated in FIG. 1 can be any type of network, such as a local area network (LAN) or a wide area network (WAN). LANs typically connect nodes over dedicated private communication links located in the same general physical location, such as a building or campus. WANs typically connect geographically dispersed nodes over long-distance communication links, such common carrier telephone lines, optical light paths, Synchronous Optical Networks (SONET), Synchronous Digital Hierarchy (SDH) links, or Power Line Communications (PLC), and so forth. Various network architectures, such as Clos networks, can be used.

A network monitor 130 can receive packet data including packet transmission data. The packet transmission data can include network traffic demands, where a demand represents a traffic flow from an ingress point to an egress point or a network source to a network destination. Additionally, the packet transmission data can include a number representing a volume of traffic, such a number of packets or bytes transmitted through a particular interface. A time can be associated with the packet data. Additionally, the packet transmission data can be on a per-port basis or a per-interface basis. The network monitor 130 can compute link utilization and the link utilization data can be associated with the packet transmission data over a time period. In a specific example, the link utilization can be bits or bytes transmitted divided by the capacity of a link for a time period. The link utilization can be a relative number, such as a percentage, or an absolute number (e.g., 50 Gigabytes/sec). The network monitor 130 can use the received packet transmission data for a current time T1, subtract the packet transmission data for a previous time, T2, and divide the difference by the time period between T1 and T2. The result is how many packets were transmitted in the time interval between T2 and T1. This number can then be divided by the capacity of the link to determine the link utilization.

The forecasting module 132 can use the data from the network monitor 130 to predict performance of network interfaces in the network 110. For example, the forecasting module 132 can analyze historical traffic pattern data, predict bandwidth requirements and estimate peak periods of network traffic. In terms of predicting bandwidth requirements, historical traffic usage, user growth, and network upgrades can all be considered in predicting future bandwidth needs. The forecasting module 132 can use a variety of different techniques in performing the forecasting of network traffic, such as statistical models, time-series analysis, predictive analytics and artificial intelligence.

A network topology database 136 may be populated using network topology factors 138 for the network 110, such as inventory information for devices in the network (e.g., intended links and nodes in the network), indications of routing protocols or forwarding logic used by devices of the network (e.g., indicating observed links and nodes), outputs of active path discovery operations performed in the network (e.g., a route-tracing function, such as traceroutes, may be employed for a particular source-destination or sender-recipient pair to observe paths), information from and/or regarding controllers in the network (e.g., indicating intended paths through the network), etc. The network topology factors 138 may be aggregated and processed to determine network paths and associated information for the network paths. These and other factors can be used to populate the network topology database 136, which includes information about how devices, such as host server computers, routers and switches are interconnected and how data flows through such devices.

A network model 140 generates a function representing a model of the network. The function can be generated periodically (at fixed, predetermined time intervals) or as a result of an event (e.g., changes to the network or changes to network traffic) using the forecasting module 132 output (which takes into account link utilization) and topology information from the topology database 136.

A simulation engine 150 is coupled to the network model 140 and receives failure information 152 as an additional input. Generally, the simulation engine 150 executes the network model 140 to simulate the behavior of network protocols (TCP/IP, UDP, BGP, Scalable Reliable Datagrams (SRD), etc.) over the network, such as routing decisions and network congestion due to the failure cases. As a result of the simulation, performance metrics of the network model are generated using the failure cases, such as network throughput and network utilization. The simulation engine 150 uses the network model 140 and simulates a defined set of network element failure cases using the failure information 152. The simulation engine 150 outputs an interface utilization and demand latency for each failure case (shown generically as utilization data 154).

The reliability data database 160 stores data related to tracking how much interfaces in the network devices 122 are available as a proportion of time. Thus, failures within those interfaces are tracked over time (history data) and are stored in the database 160. The reliability data can then be fed into a failure probability analysis 162, which determines the probability of failure and mean-time-to-repair (MTTR) for each network element (e.g., link, node, site, SRLG). The failure probability analysis 162 combines failure rates with operating time to estimate the failure probability over a specified period. Such a determination can be performed using probability functions, fault trees, or other techniques. Thus, the failure probability analysis determines availability based upon captured history data from the network relating to how often interfaces in the network are operational. The resultant output 163 is data related to the probability of failure. The availability analysis engine 164 combines the probability of each failure, with the interface utilization resulting from that failure to determine the utilization probability density distribution (e.g., from worst-case planning to probabilistic planning) for an availability target 166. The availability target 166 is typically less than 100% and allows control of business tradeoffs between capacity (and associated costs) against the additional availability that the capacity provides. Combining the probability of each failure with the corresponding MTTR for that failure, a determination is made how often each failure is predicted to occur and how long the failure is predicted to last. Using this, an availability probability distribution is produced for that span. This will then enable a determination of what capacity is needed for each interface to achieve a specified availability target. This ensures that the method considers only the impact of those failure cases, which are required to achieve desired network availability targets. The resultant output is a signal (a network capacity update 168) to modify network capacity, such as an increase or decrease in network capacity. An increase in network capacity can include installing new network devices and/or network links. A decrease in network capacity can include removing network devices and/or network links. As a result, of such modifications, the network topology is changed.

The signal 168 from the availability analysis 164 can also be transmitted to the network devices 122 to implement changes, such as changes to forwarding tables in the network devices to modify traffic routing through the network. For example, the forwarding tables in the network devices 122 can direct traffic to less congested network areas to ensure that the packet loss rate target is met.

Figure 2:
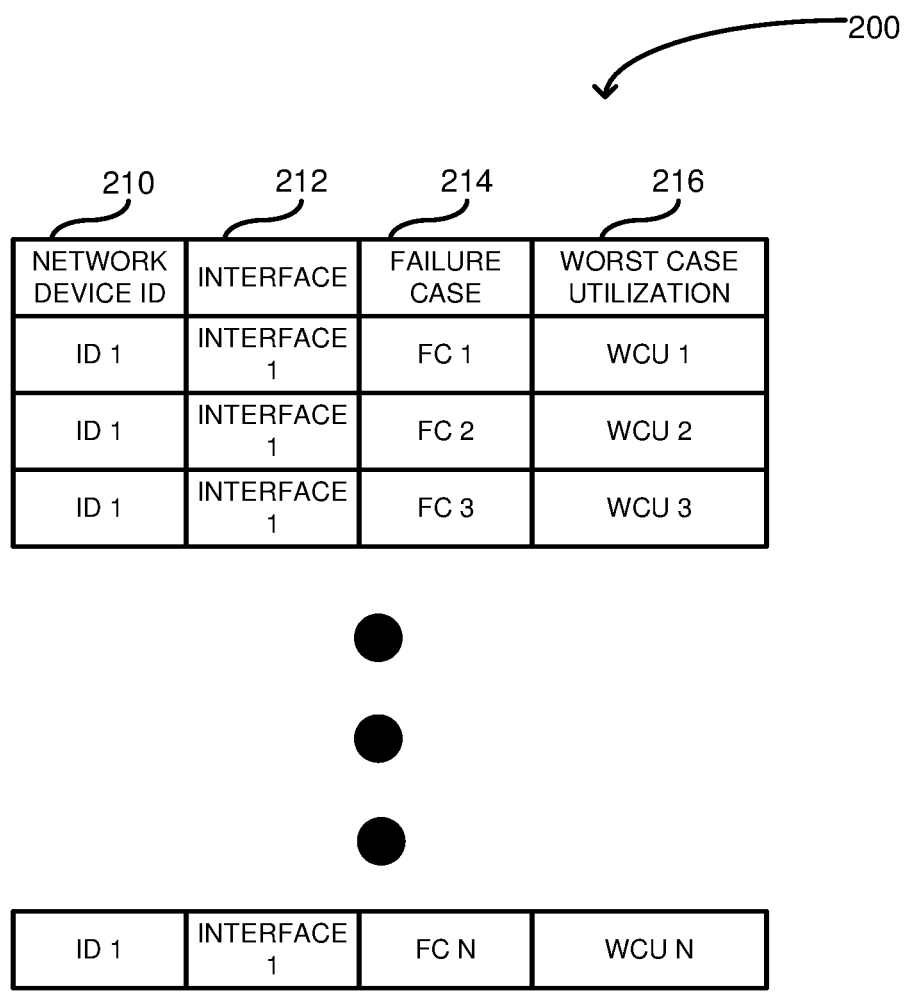
FIG. 2 shows an example of a plurality of failures and a resultant utilization for a network interface.

FIG. 2 shows a table 200 of the utilization for each interface for each failure case simulated (as opposed to a single worst-case failure). Each row in the table 200 of FIG. 2 represents an interface utilization for a specific failure case. Column 210 represents the network device identifier and column 212 is one of the interfaces on the network device (e.g., an interface on a router). Column 214 represents a failure case for the interface and column 216 represents a utilization simulated for the failure case and that interface. As can be seen, instead of using just a single worst-case utilization, the failure probability analysis 162 uses utilizations over a plurality of failure cases. For example, table 200 shows N different failure cases (where N is the number of failure cases considered) in column 214 and N different utilization numbers in column 216 for each failure case. Additionally, although table 200 shows only a single interface on a single network device, the table 200 generally includes all interfaces on a plurality of network devices. A failure case or failure scenario represents the impact that the failure of other links or network devices has upon the interface in question. Generally, the failure of other network devices or links in the network results in an increase in network traffic on the interface in question.

Figure 3:
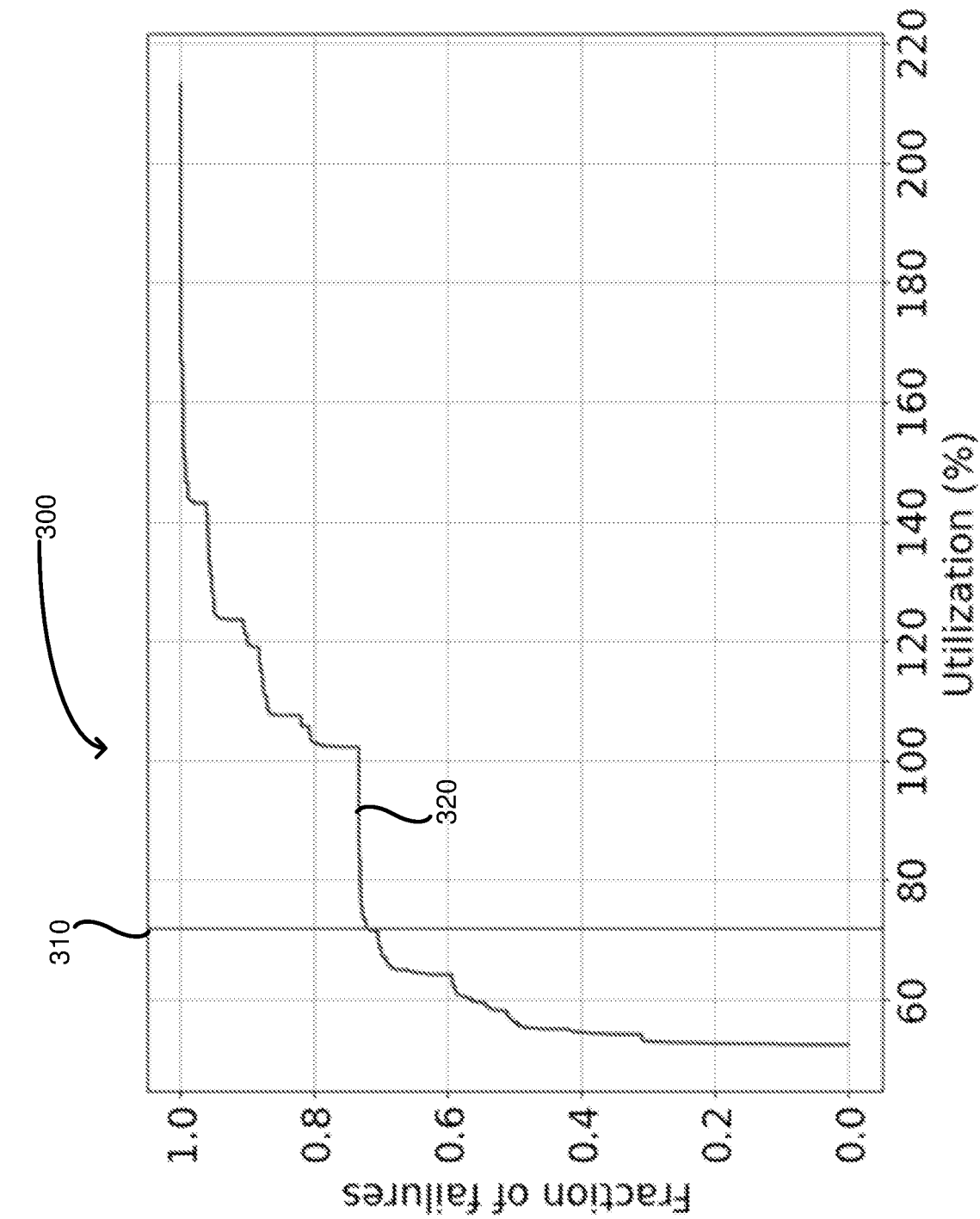
FIG. 3 shows an example of the distribution of utilization for a set of failure cases for the network interface.

FIG. 3 is a graph 300 showing a distribution of failure cases versus a percentage of utilization for an interface on a network device. Generally, a line 310 shows a maximum target utilization for the interface, which is chosen to ensure low packet loss and latency. In this example, the maximum target utilization is about 75%. Above this value, the interface is considered congested. The distribution crosses the 75% maximum target utilization at about 0.7, meaning that about 70% of the failure cases resulted in the target maximum utilization of the network interface not being reached. However, about 30% of the failure cases resulted in a larger percentage of utilization for the network interface. Given that it is known how often each failure is predicted to occur and how long it will last, a prediction can be made of what percentage of time the interface will be at which utilization, i.e., due to the probability of the failures that cause each utilization. This enables an understanding about the relationship between the capacity provisioned and the percentage of time that capacity will be uncongested, i.e., the span availability.

Figure 4:
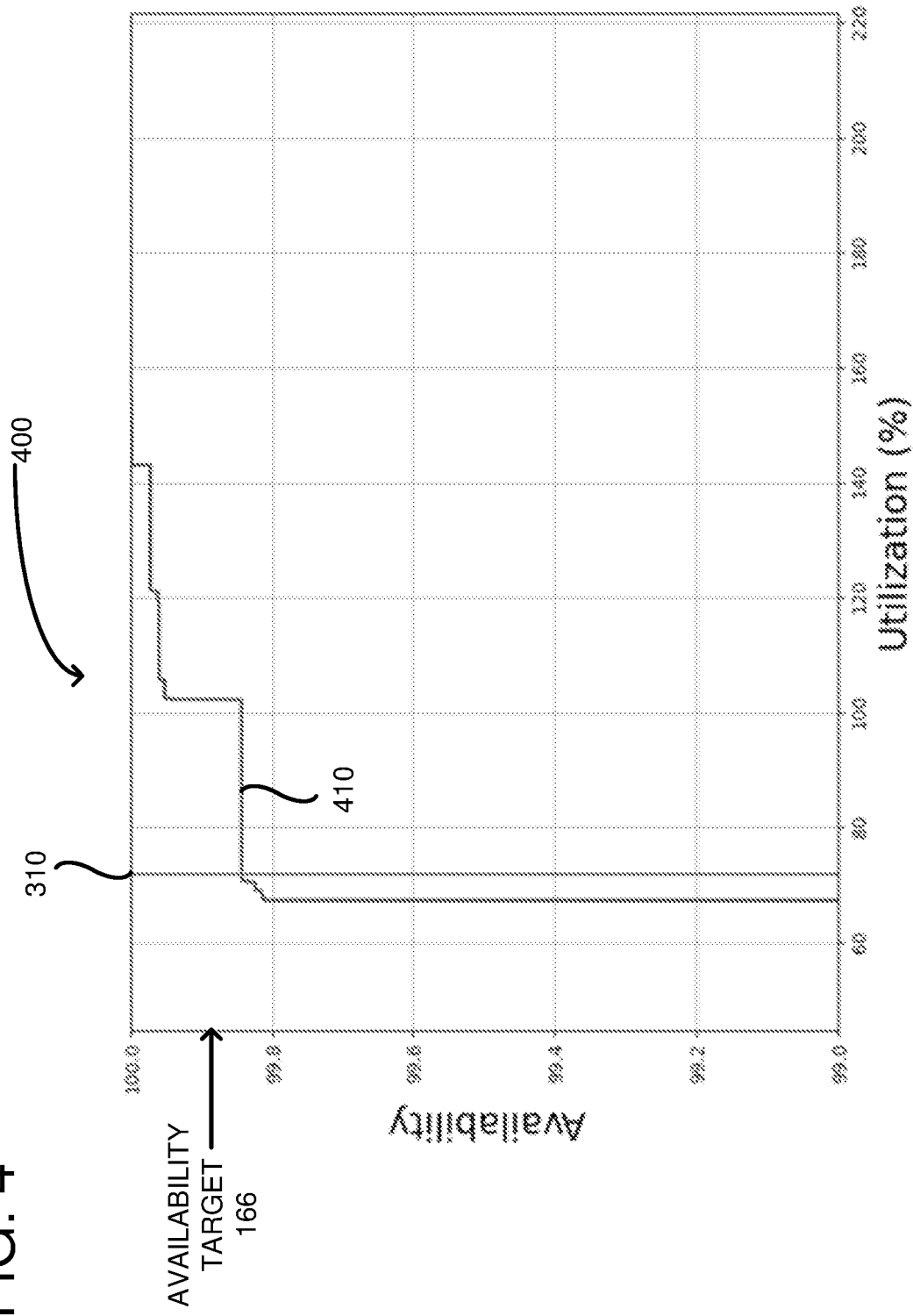
FIG. 4 shows an example of the distribution of the expected availability of an interface versus the provisioned capacity expressed in percent utilization of the current capacity.

FIG. 4 shows a graph 400 illustrating the availability of the interface (i.e., time uncongested) versus the utilization of the network interface. Like FIG. 3, the line 310 shows the capacity of the interface in terms of the percentage of the currently installed capacity. The line 410 represents the availability of the interface. According to the graph 400, at about the 75% utilization target, the availability of this interface, in terms of percent of time uncongested, is predicted to be about 99.85% (where line 310 and 410 cross). Generally, this means that the interface will be congested for about 788 minutes or 13.1 hours in a year. The availability target 166 can be adjusted along the availability axis. If the availability target 166 is moved to 100%, the utilization percentage can be significantly higher than an availability of 99.8% of the time. The system 100 can facilitate a balancing between adding network capacity and desired availability. For example, a significant added cost can be incurred to ensure an interface is at 100% availability. However, a substantial added cost for minimal additional availability might not be a best use of resources. Accordingly, the ability to move the availability target 166 to select a target of less than 100% can provide a balance of desired results. More particularly, the ability to move the availability target allows an administrator or user to balance a cost of adding network devices or links versus the availability of interfaces on those network devices.

Figure 5:
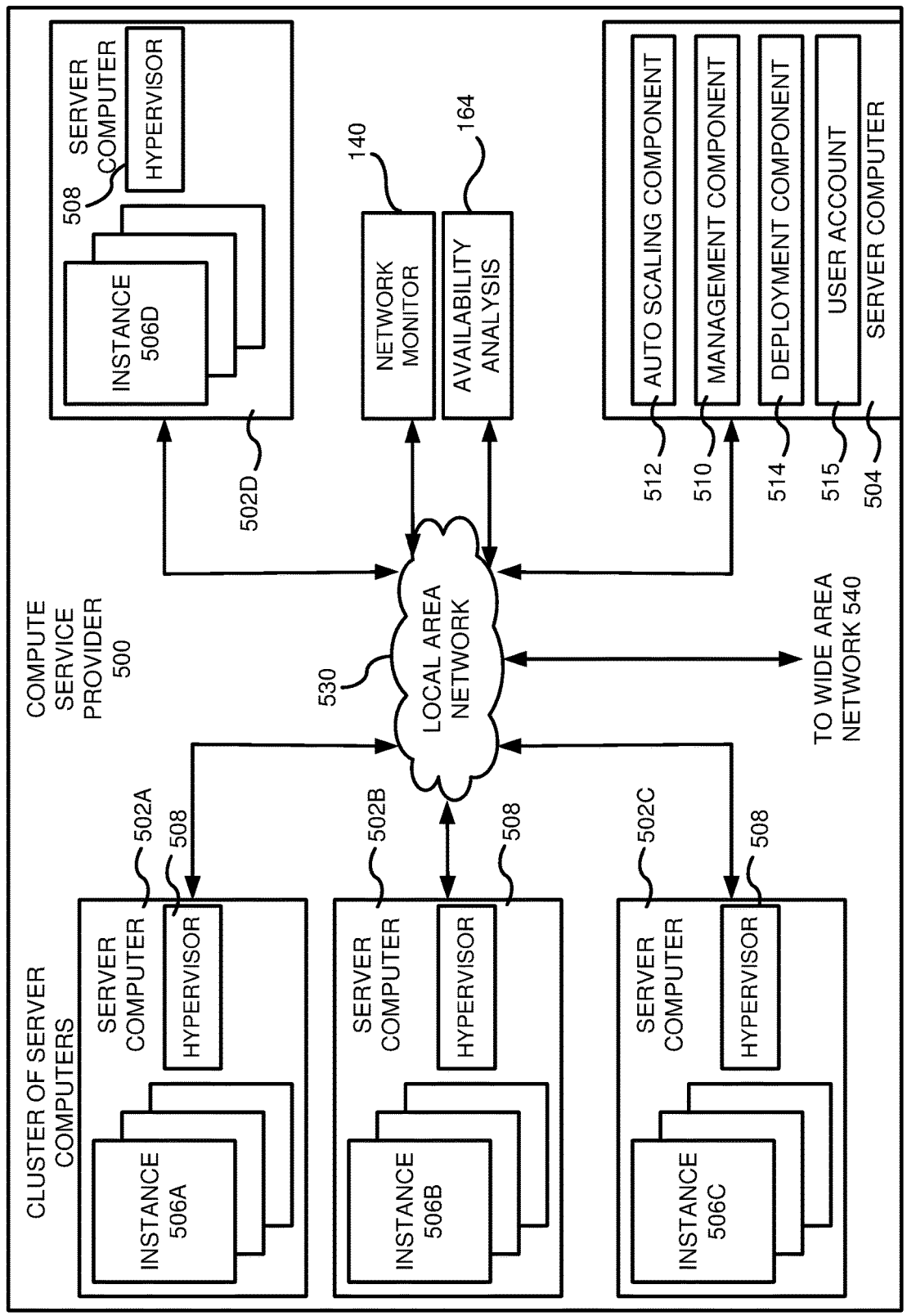
FIG. 5 is an example system diagram showing a plurality of virtual machine instances running in a compute service provider environment.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of users operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A user can access the management component 510 to configure various aspects of the operation of the instances 506 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 512 can scale the instances 506 based upon rules defined by the user. In one embodiment, the auto scaling component 512 allows a user to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist users in the deployment of new instances 506 of computing resources. The deployment component can have access to account information associated with the instances, such as who is the owner of the account, credit card information, country of the owner, etc. The deployment component 514 can receive a configuration from a user that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the user-provided configuration and cache logic to configure, prime, and launch new instances 506. The configuration, cache logic, and other information may be specified by a user using the management component 510 or by providing this information directly to the deployment component 514. The instance manager can be considered part of the deployment component.

User account information 515 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

The network monitor 140 and the availability analysis 164 can both execute on one or more server computers within the compute service provider 500. In one embodiment, the network monitor 140 and/or the availability analysis 164 can execute as instances 506 on one or more server computers 502 within the compute service provider 500. Other components from FIG. 1 can similarly execute within the compute service provider, such as the failure probability analysis 162, the simulation engine 150 and the network model 140.

Figure 6:
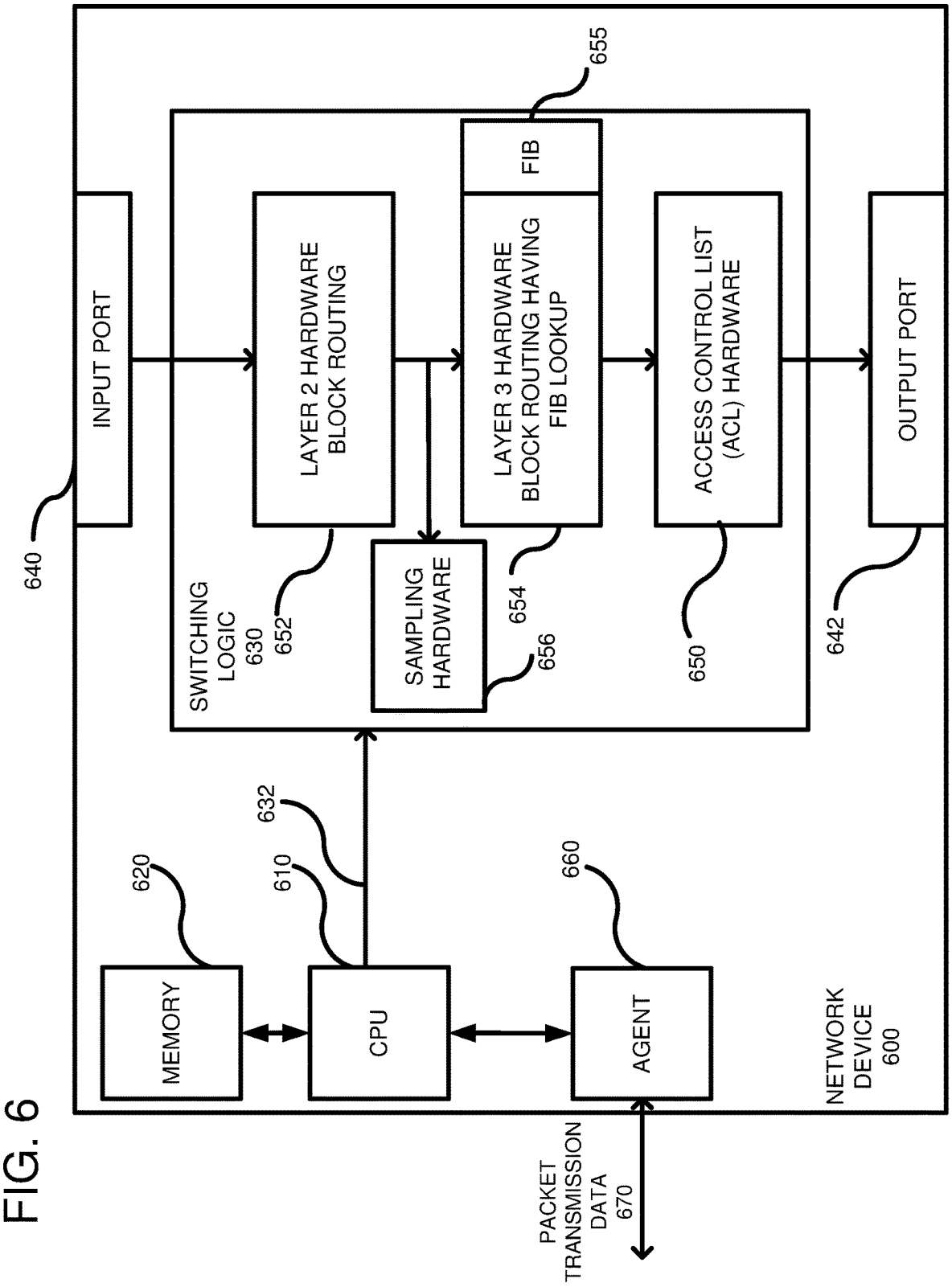
FIG. 6 is an example router that transmits packet data to a monitoring server computer.

FIG. 6 shows a detailed example of an embodiment of the network device 600. Network device 600 is a switch that routes packets to a next hop in the network using a destination IP address. A CPU 610 is coupled to a memory 620 and to switching logic 630 through a bus 632 (PCIe or other protocols and bus types can be used). The switching logic 630 is positioned between an input port 640 and an output port 642, which are typically adapted to receive network cables, such as Ethernet cables. Although only one input port 640 and one output port 642 are shown, typically there are multiple ports (also called interfaces) on a network device. The switching logic 630 can be a single ASIC integrated circuit or divided into multiple integrated circuits. The switching logic 630 can include multiple different hardware logic blocks including a layer 2 hardware block 652, a layer 3 hardware block 654, and an Access Control List (ACL) hardware block 650. The layer 2 hardware block 652 relates to an Ethernet layer and can forward packets based on MAC tables. The layer 2 lookup ensures that an incoming packet's MAC address equals the MAC address of the network device 600. If so, then the packet can proceed onto the layer 3 hardware. If not, then the layer 3 lookup does not occur. The layer 3 hardware block 654 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a FIB 655, which includes destination addresses (e.g., prefixes) for packets being transmitted through the switching logic and associated ports for forwarding the packets. The network device 600 can run routing protocols, such as an Open Shortest Path First (OSPF) or a Routing Information Protocol (RIP), to communicate with other Layer 3 switches or routers. The routing tables are used to lookup the route for an incoming packet. The ACL block 650 relates to permissions and can include rules whether to drop packets. The different hardware blocks can be coupled in series and additional hardware blocks can be added based on the design. Packets pass from the input port 640 to the output port in accordance with the configuration of the hardware logic blocks 650, 652, 654, which are considered a switching pipeline. The input port 640, output port 642 and switching logic 630 can be considered a data plane or forwarding plane of the network device 600. By contrast, the CPU 610, memory 620, and an agent 660 are considered part of a control plane. Sampling hardware 656 can be provided anywhere in the switching pipeline and periodically (fixed time intervals) or randomly samples buffers in the switching logic 630 or packets passing through the network device 600. The sampling hardware 656 is shown in between the layer 2 and layer 3 hardware but can be situated at other locations. As shown, the agent 660 can execute on the CPU 610 and can be used to receive sampled packets from the sampling hardware 656. The sampling hardware 656 can collect the packet transmission data and pass it to the agent 66, which can, in turn, transmit the information to the network monitor 130, as indicated at 670. The agent 660 can further add a timestamp to the information, if desired. Although this embodiment shows the sampling hardware 656, the function of the sampling hardware can be performed in software, such as within the agent 660.

Figure 7:
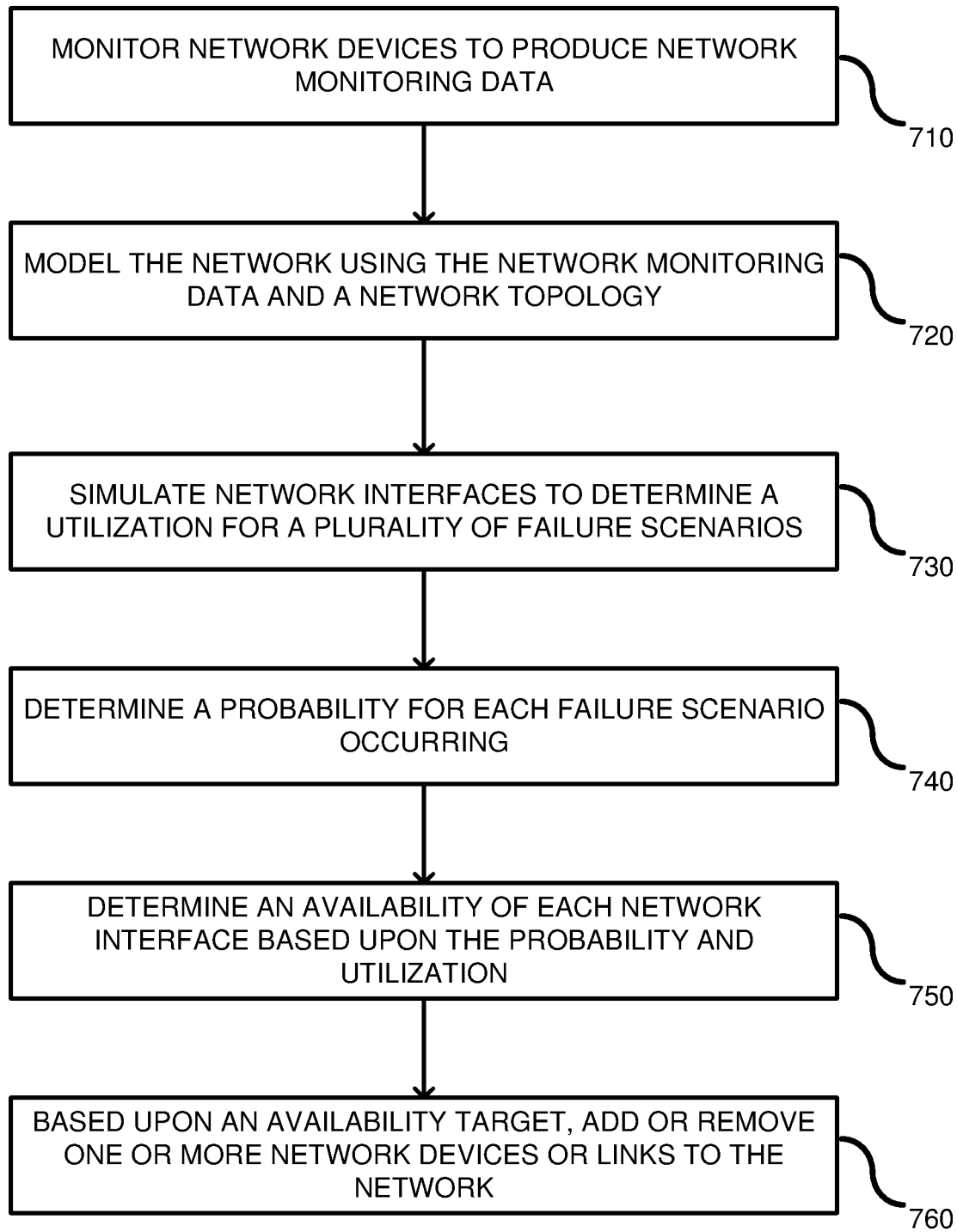
FIG. 7 is a flowchart according to one embodiment for adding network capacity.

FIG. 7 is a flowchart for adding or removing network capacity according to one embodiment. In process block 710, network devices are monitored to produce network monitoring data. For example, in FIG. 6, the agent 660 can transmit packet transmission data 670 to a network monitor 130 (FIG. 1). In process block 720, the network can be modeled using the network monitoring data and a network topology. For example, in FIG. 1, a network model 140 can use the data from the network monitor 130 and the network topology data 136 to model the network. In some embodiments, the network monitoring data can pass through a forecasting module 132 before being received by the network model 140. In process block 730, network interfaces are simulated to determine utilization for a plurality of failure scenarios. For example, in FIG. 1, the simulation engine 150 can receive failure information 152 (which includes failure scenarios, which includes link, node or shared-risk failures or combinations thereof) and determines utilization on the network interface based upon the network model 140. A shared-risk failure is when at least two network elements, such as links or network devices, in the network fail together at a same time, such as due to geographic proximity. In process block 740, a probability of occurring is determined for each failure scenario. For example, in FIG. 1, based upon actual failure data in the reliability database 160, the failure probability analysis 162 can determine probabilities of failure. In process block 750, a determination is made regarding the availability of each network interface based upon the probability and utilization. For example, in FIG. 1, the availability analysis 164 can receive the probability of failure data 163 and the utilization data 154 and can determine the availability of each network interface (see FIG. 4). In process block 760, based upon the availability target, one or more network devices can be added or removed from the network. Thus, the network capacity can be increased or decreased. Returning to FIG. 1, the availability target 166 (which is less than 100%) is used to determine what network updates 168 are needed.

Figure 8:
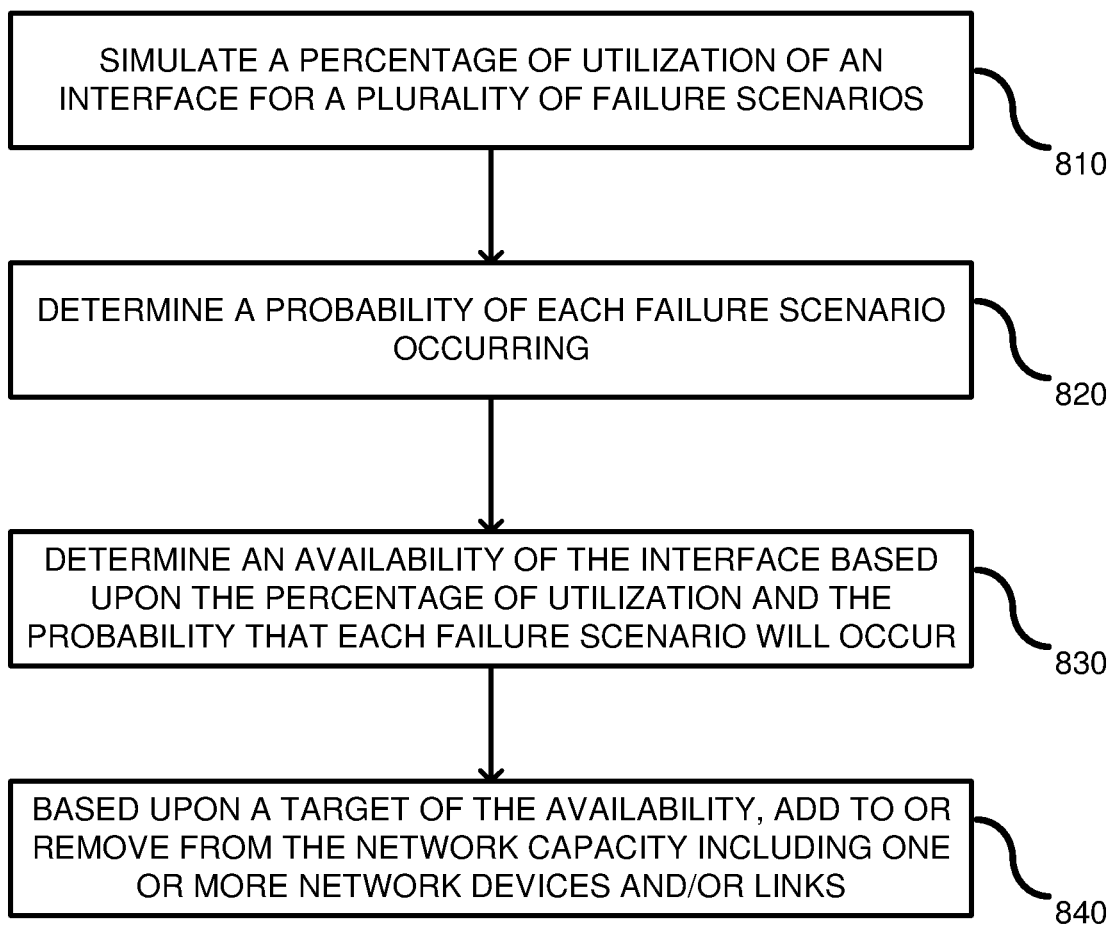
FIG. 8 is a flowchart according to another embodiment for adding network capacity.

FIG. 8 is a flowchart for adding or removing network capacity according to another embodiment. In process block 810, a percentage of utilization of an interface is simulated for a plurality of failure scenarios. For example, in FIG. 1, the simulation engine 150 can receive failure information 152, which can include failure scenarios. A list of failure scenarios is shown at column 214 in FIG. 2. The simulation can result in data shown in FIG. 3 including a fraction of failures versus utilization. In process block 820, a probability is determined that each failure scenario will occur. For example, in FIG. 1, the failure probability analysis 162 can determine the probability based upon actual data collected by the network monitor 130 and stored in the reliability data database 160. In process block 830, an availability of the interface is determined based upon the percentage of utilization and the probability determination. For example, in FIG. 1, the availability analysis 164 receives the probability of failure data 163 and the utilization data 154 and determines the availability of the interface, which is shown in FIG. 4. Then in process block 840, based upon a target of availability, one or more network devices and/or links are added to or removed from the network. Thus, the network capacity can be increased or decreased. For example, in FIG. 4, the availability target 166 is adjusted and a determination can be made regarding capacity to add to or subtract from the network.

Figure 9:
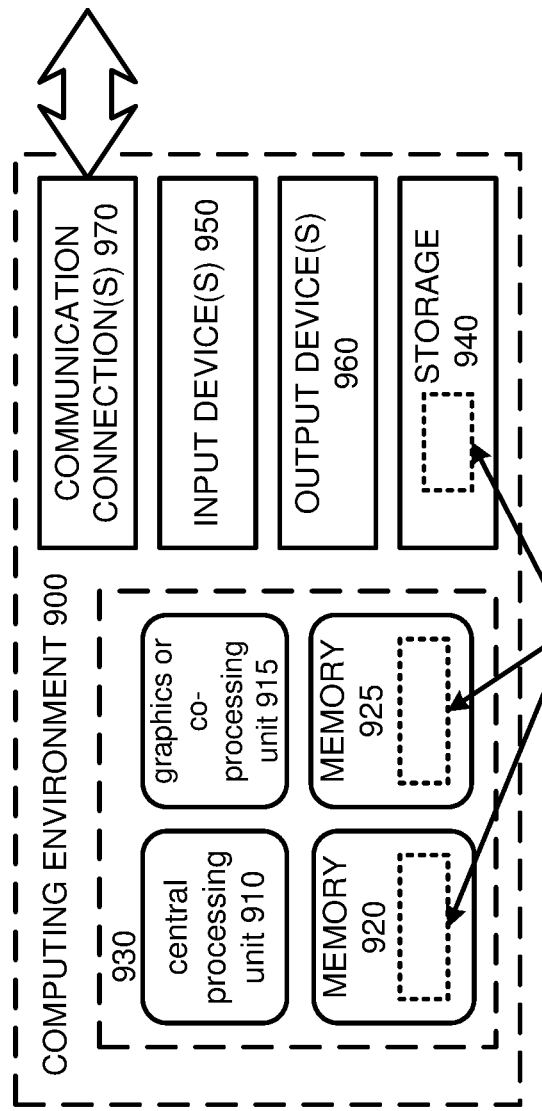
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s). For example, the software 980 can implement the availability analysis 164 of FIG. 1.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of adding or removing network devices or links to a network, the method comprising:
   monitoring network devices in the network to produce network monitoring data, wherein the monitoring of network devices includes receiving, in a server computer, packet transmission data from the network devices;
   modeling the network using the network monitoring data, including the packet transmission data, and a network topology;
   simulating network interfaces for the network devices to determine a utilization of the network interfaces for a plurality of failure scenarios in the network, wherein the simulating includes simulating a behavior of a network protocol;
   determining a probability of each of the plurality of failure scenarios occurring based upon the simulating of the network interfaces;
   determining an availability of each of the network interfaces based upon the probability and the utilization;
   based upon an availability target, which is settable by a user, for each of the network interfaces, adding or removing one or more network devices or links to the network to reach the availability target of each interface, wherein the availability target allows the user to balance a cost of adding the network devices or the links versus the availability of those network devices or links; and
   storing modifications to forwarding tables in the network devices based on the adding or removing of the one or more network devices or links and transmitting network packets through the one or more network devices based upon the forwarding tables.

2. The method of claim 1, wherein the network monitoring data comprises packet transmission data including network traffic demands, where a demand represents a traffic flow from a network source to a network destination.

3. The method of claim 1, wherein the availability target is less than 100 percent available to balance a cost of adding network devices or links versus the availability of interfaces on those network devices.

4. The method of claim 1, wherein the plurality of failure scenarios includes link, node or shared risk failures or combinations thereof.

5. A method, comprising:
   for an interface of a network device, simulating, using a simulation engine, a percentage of utilization of the interface for a plurality of failure scenarios in the network, wherein the simulating includes simulating a behavior of a network protocol;
   based upon the simulating, determining a probability of each of the plurality of failure scenarios occurring;
   determining an availability of the interface based upon the percentage of utilization and the probability that each of the plurality of failure scenarios will occur;
   based upon a target of the availability for the network interface, increasing or decreasing network capacity to reach the availability target for the network interface, wherein the increasing or decreasing of the network capacity includes storing modifications to a forwarding table in the network device, wherein the target is adjustable by a user to balance a cost of adding the network capacity versus the availability of the network interface; and
   transmitting network packets through the network device based upon the forwarding table.

6. The method of claim 5, further comprising monitoring network devices within the network by receiving packet transmission data from the network devices within a centralized server computer.

7. The method of claim 6, further including forecasting an increase or decrease in network traffic based upon the monitoring of the network devices.

8. The method of claim 7, further including modeling the network using the forecasting of network traffic and a network topology.

9. The method of claim 5, wherein the simulating includes executing a network model derived using monitoring data received from the network and topology data of the network.

10. The method of claim 5, wherein the plurality of failure scenarios include link, node or shared risk failures or combinations thereof.

11. The method of claim 5, wherein the target of the availability is less than 100 percent.

12. The method of claim 5, wherein the increasing or decreasing of the network capacity includes adding to or removing from the network one or more network links or network devices.

13. The method of claim 5, wherein the determining of the availability includes capturing history data from the network relating what proportion of time interfaces in the network are operational.

14. A system, comprising:
   a plurality of network devices in a network, wherein the plurality of network devices includes forwarding tables;
   a monitoring server computer coupled to the plurality of network devices to monitor packet transmission data associated with the plurality of network devices;

a simulation engine coupled to the monitoring server computer for receiving failure information associated with a plurality of failure scenarios in the network and for producing utilization data associated with interfaces under failure for the plurality of network devices, wherein the producing of the utilization data includes simulating a behavior of network protocols on the interfaces;

an availability analysis server computer coupled to the simulation engine for receiving the utilization data and for receiving probability of failure data and for determining network capacity updates needed to achieve an availability target, wherein the availability target is adjustable by a user, and wherein the availability analysis server computer is configured to update the forwarding tables of the network devices to modify how packets are transmitted through the network devices.

15. The system of claim 14, wherein the packet transmission data includes network traffic demands, where a demand represents a traffic flow from a network source to a network destination.

16. The system of claim 14, wherein the network devices include routers and switches.

17. The system of claim 14, further including a database for storing network topology data and a network model server computer coupled to the network topology database and the monitoring server computer for generating a network model.

18. The system of claim 14, wherein the availability target is less than 100 percent.

19. The system of claim 14, wherein the network is within a compute service provider.

* * * * *